US011374995B2

(12) United States Patent
Chen et al.

(10) Patent No.: US 11,374,995 B2
(45) Date of Patent: Jun. 28, 2022

(54) MULTIMEDIA FILE PROCESSING

(71) Applicant: Shanghai Bilibili Technology Co., Ltd., Shanghai (CN)

(72) Inventors: Zhiwei Chen, Shanghai (CN); Junxing Tang, Shanghai (CN); Pengcheng Li, Shanghai (CN); Longwen Gao, Shanghai (CN); Yi Wang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 80 days.

(21) Appl. No.: 16/414,603

(22) Filed: May 16, 2019

(65) Prior Publication Data

US 2019/0356717 A1 Nov. 21, 2019

(30) Foreign Application Priority Data

May 17, 2018 (CN) .......................... 201810476956.7

(51) Int. Cl.
H04L 29/06 (2006.01)
H04L 65/60 (2022.01)
H04L 67/02 (2022.01)

(52) U.S. Cl.
CPC ............ *H04L 65/607* (2013.01); *H04L 67/02* (2013.01)

(58) Field of Classification Search
CPC ....... H04L 65/607; H04L 67/02; H04L 67/06; H04L 65/60
See application file for complete search history.

(56) References Cited

U.S. PATENT DOCUMENTS

| 9,112,936 | B1* | 8/2015 | Poletto .............. H04L 29/08117 |
| 2008/0059989 | A1 | 3/2008 | O'Connor et al. |
| 2011/0173345 | A1* | 7/2011 | Knox ...................... H04L 69/08 |
| | | | 709/246 |

(Continued)

FOREIGN PATENT DOCUMENTS

| CN | 101227590 A | 7/2008 |
| CN | 101447994 A | 6/2009 |

(Continued)

*Primary Examiner* — Gil H. Lee
*Assistant Examiner* — Juan C Turriate Gastulo
(74) *Attorney, Agent, or Firm* — BakerHostetler

(57) ABSTRACT

Techniques for processing a multimedia file in real-time are described herein. The disclosed techniques include receiving a plurality of fragments of a multimedia file by a data stream conversion service, wherein the data stream conversion service receives a first fragment containing metadata of the multimedia file and then receives other fragments of the multimedia file in a predetermined order; sending a notification message to a message queue by the data stream conversion service in response to receiving the first fragment, wherein the notification message includes the metadata of the multimedia file and a corresponding Hyper Text Transfer Protocol (HTTP) interface address; obtaining the notification message from the message queue by an encoding and decoding service; and processing the other fragments of the multimedia file based at least in part on the notification message by the encoding and decoding service.

20 Claims, 3 Drawing Sheets

(56) References Cited

U.S. PATENT DOCUMENTS

| | | | | |
|---|---|---|---|---|
| 2014/0010517 | A1* | 1/2014 | Sheffler | H04N 21/23418 386/226 |
| 2015/0101027 | A1* | 4/2015 | Zhao | H04L 63/10 726/4 |
| 2015/0222681 | A1* | 8/2015 | Basile | H04L 65/60 709/219 |
| 2017/0070302 | A1* | 3/2017 | Tuscano | H04L 47/50 |
| 2017/0093954 | A1* | 3/2017 | Lim | H04L 67/2847 |
| 2018/0270292 | A1* | 9/2018 | Perahia | H04W 76/19 |
| 2019/0281367 | A1* | 9/2019 | Westerlund | H04N 21/84 |

FOREIGN PATENT DOCUMENTS

| | | |
|---|---|---|
| CN | 102316127 A | 1/2012 |
| CN | 102456076 A | 5/2012 |
| CN | 104219537 A | 12/2014 |
| CN | 104363511 A | 2/2015 |
| CN | 106453474 A | 2/2017 |
| CN | 106657266 A | 5/2017 |
| CN | 107454416 A | 12/2017 |
| CN | 107770229 A | 3/2018 |

\* cited by examiner

MULTIMEDIA FILE PROCESSING

CROSS-REFERENCE TO RELATED APPLICATION

The present application claims priority of Chinese patent application No. 201810476956.7, filed on May 17, 2018. The entire disclosure of the above-identified application is hereby incorporated by reference herein and made a part of this specification.

BACKGROUND

With the development of the Internet technology, people often achieve uploading, downloading and playing multimedia files such as videos, audios, pictures and so on through the Internet, that is to say, one user can upload a multimedia file to a multimedia service provider such as a video website, a music website and so on as a multimedia file provider, and the multimedia file can be downloaded and played by other users. The background system of the multimedia service provider needs to carry out processing operations such as encoding, decoding, transcoding, etc. to the multimedia file uploaded by the user, so that the other users can access and obtain it. Conventionally, the multimedia file can be processed by the background system of the multimedia service provider only after the uploading of the multimedia file is finished, which prolongs the process of processing the multimedia file, and also prolongs the response time of the other users accessing the multimedia file.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Figure 1:
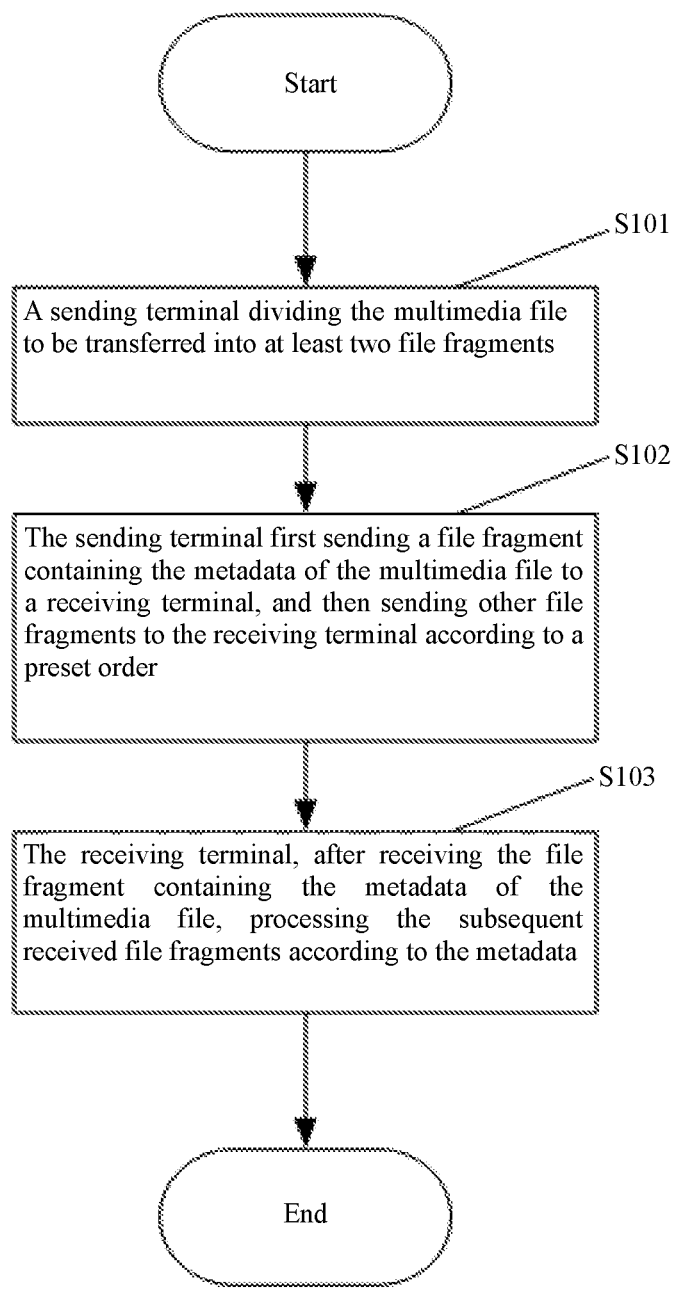
FIG. 1 is a flowchart illustrating an example processing a multimedia file in accordance with the present disclosure.

Hereinafter the advantages of the present invention are further illustrated in detail by combining the following embodiments with the accompanying drawings. The exemplary embodiments will be elucidated in detail here, and their examples are shown in the attached drawings. When the following descriptions relate to the attached drawings, unless otherwise stated, the same numbers in different drawings represent the same or similar elements. The implementations described in the following exemplary embodiments do not represent all implementations consistent with the present disclosure. On the contrary, they are only examples of devices and methods that are consistent with some aspects of the present disclosure as stated in detail in the appended claims.

The terms used in the present disclosure are intended solely to describe specific embodiments, rather than to limit the present disclosure. The "A", "said" and "the" in the singular form used in the present disclosure and the appended claims are also intended to include the plural form, unless the context clearly indicates other meanings. It should also be understood that the term "and/or" used in the present text refers to any or all possible combinations of one or more related items listed.

It should be understood that although various information may be described in terms of first, second, third and so on in the present disclosure, such information should not be limited to these terms. These terms are used only to separate the same type of information from one another. For example, without departing from the scope of the present disclosure, the first information can also be referred to as the second information, and similarly, the second information can also be referred to as the first information. Depending on the context, for example, the word "if" used here can be interpreted as "at the time of" or "when" or "responding to determining".

In the description of the present invention, it needs to be understood that the orientation or position relationships indicated by terms "longitudinal", "lateral", "upper", "lower", "front", "back", "left", "right", "vertical", "horizontal", "top", "bottom", "outside", "inside", etc. are based on the orientation or position relationships shown in the attached drawings, it is only to facilitate and simplify the description of the present invention, and not to indicate or imply that the device or element referred to must have a specific orientation, be constructed and operated in a specific orientation, so it can not be understood as a limitation to the present invention.

In the description of the present invention, unless otherwise specified and limited, it should be noted that, the terms "installation", "be connected with" and "connection" should be understood in a broad sense, such as they can be mechanical connection or electrical connection, or internal connection of two components, direct connection or indirect connection through an intermediate medium, for those technicians skilled in the art, the specific meaning of the above terms can be understood according to specific situations.

In the subsequent description, suffixes such as "module", "component" or "unit" for representing elements are used in order to only facilitate the illustration of the present invention and they have no specific meanings themselves. Therefore, "module" and "component" can be used mixedly.

FIG. 1 is a flowchart of an example multimedia file processing method in a preferred embodiment of the present invention, the present method is used to process a multimedia file transferred between a sending terminal and a receiving terminal, the sending terminal can be a user equipment for uploading the multimedia file, such as a smartphone, a computer, etc., and the receiving terminal can be a background system for receiving and processing the multimedia file, such as a server of a multimedia provider and a multimedia management system. The multimedia file processing method comprises the following steps:

S101: the sending terminal dividing the multimedia file to be transferred into at least two file fragments.

Before the sending terminal transfers the multimedia file, it first divides the multimedia file into several file fragments, that is, "fragmentation". The fragment uploading function supports cutting a file into a series of small data fragments (i.e. file fragments) with specific sizes, uploading these small data fragments to the receiving terminal, respectively, and then merging these small data fragments into a resource at the receiving terminal after the uploading of all small data fragments is finished. The selection of the sizes of the file fragments can be determined according to the whole size of the multimedia file, for example, when the size of the multimedia file is less than 2 GB, the size of each file fragment can be divided into 2 MB to LOMB, preferably 4 MB. When the sending terminal divides the multimedia file, it often divides and sorts the file fragments according to the playing order of the multimedia file, that is to say, the file fragment whose playing time is early is at the front, the file fragment whose playing time is late is at the back.

S102: the sending terminal first sending a file fragment containing the metadata of the multimedia file to the receiving terminal, and then sending other file fragments to the receiving terminal according to a preset order.

The present step is an important reflection of the concept of the present invention, that is to say, the sending terminal first sends the file fragment containing the metadata of the multimedia file to the receiving terminal. After the step of S101 of dividing the multimedia file into the file fragments, the information of the metadata is stored in one or more of the file fragments, the present step preferentially transfers the file fragments containing the metadata. After the transfer of the file fragments containing the metadata is finished, the sending terminal can send other file fragments to the receiving terminal according to a preset order, for example, it sends the other file fragments one by one or concurrently according to the playing order of the multimedia file.

In the prior art, the file fragments are usually transferred sequentially according to the intended playing order of the multimedia file, and the metadata are often arranged at the end of the multimedia file, which results in that when the transfer of the whole multimedia file is finished, the receiving terminal can obtain the metadata. The key point of the present step is to customize the transfer order of the file fragments, so that the information of the metadata can be transferred first, and the receiving terminal can start the subsequent processing operations as soon as possible after obtaining the metadata, without waiting for the transfer of the whole multimedia file to be finished.

For the case that the metadata are arranged at the end of the multimedia file, since the amount of the information of the metadata is relatively small relative to that of the multimedia file itself, the sending terminal can send two file fragments at the end of the multimedia file preferentially to ensure that the file fragment containing the metadata can be sent, and then send the file fragments at the head of the multimedia file, and subsequently send the subsequent file fragments sequentially according to the playing order. In other embodiments of the present invention, other preset orders may also be customized, such as starting the transfer from the middle of the multimedia file, or starting the transfer at a certain proportion of the playing progress.

The sending terminal and the receiving terminal can establish a communication connection through the Internet and transfer files through a Hyper Text Transfer Protocol (HTTP) or other communication protocols. The receiving terminal can also receive the multimedia files located in the local or local area network, and transfer the multimedia files through file reading and writing or the LAN communication protocol.

S103: the receiving terminal, after receiving the file fragment containing the metadata of the multimedia file, processing the subsequent received file fragments according to the metadata.

When the sending terminal starts the transfer, the receiving terminal receives the file fragments containing the metadata of the multimedia file at the first time, obtains the metadata, and then can process the subsequent received file fragments according to the metadata. In this way, the receiving terminal does not need to wait for all file fragments to be transferred completely before processing. When the metadata is obtained, after a file fragment is received, the processing to the received file fragment can be started, which greatly shorten the time waiting for processing the multimedia file. In this step, the processing means of the receiving terminal to the file fragments include any one of image capturing, audio intercepting, transcoding, encoding and decoding.

Compared with the prior art, the present disclosure provides the following beneficial effects: (1) The multimedia files are processed in real-time when they are uploaded; and (2) the process of the background system processing the multimedia files is speeded up, so that all subsequent operations depending on the intermediate results generated by the processing will be improved in the processing speed.

Figure 2:
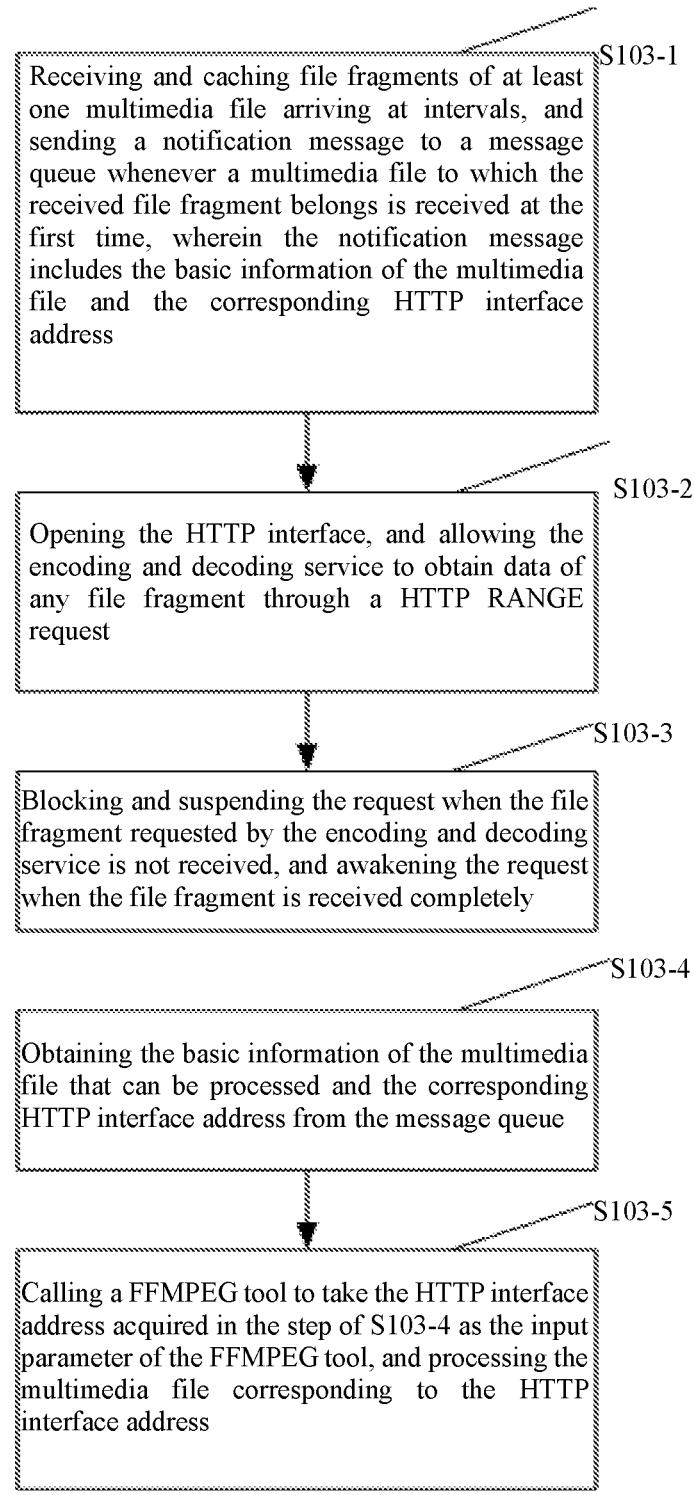
FIG. 2 is a flowchart illustrating an example of receiving and processing multimedia files in accordance with the present disclosure.

Please refer to FIG. 2, which is the specific flow chart of the step of S103 in FIG. 1. In the present embodiment, in the step of S103 the receiving terminal processes the file fragments through the data stream conversion service and the encoding and decoding service. The data stream conversion service and the encoding and decoding service both run in the background system of the receiving terminal, and interact with each other through the HTTP protocol. The data stream conversion service is implemented by the following steps:

S103-1: receiving and caching file fragments from at least one multimedia file arriving at intervals, and sending a notification message to a message queue whenever the multimedia file to which the received file fragment belongs is received at the first time, wherein the notification message includes the basic information of the multimedia file and the corresponding HTTP interface address.

By running some certain threads or processes, a computer can provide a certain type of service. In the present embodiment, the data stream conversion service can receive and cache file fragments arriving at intervals, and the received multiple file fragments may come from different multimedia files. The key point of the present step is that when the multimedia file to which the received file fragment belongs is received by the data stream conversion service at the first time, that is to say, the file fragment is the first received file fragment of one multimedia file, the multimedia file is new to the data stream conversion service, a notification message is sent to a message queue, wherein the notification message includes the basic information of the multimedia file and the corresponding HTTP interface address. The message queue is a container for storing messages in the process of transferring the messages, it is preferable to use the Kafka message queue or other message queues provided by other third-party service providers. Each multimedia file has its corresponding HTTP interface address for accessing and obtaining any fragment of the multimedia file externally.

S103-2: opening the HTTP interface, and allowing the encoding and decoding service to obtain data of any file fragment through a HTTP RANGE request;

In the present step, the data stream conversion service opens the HTTP interface, and allows the encoding and decoding service to obtain data of any file fragment through a HTTP RANGE request. The HTTP RANGE request is a request header based on the HTTP protocol, a request sent by a client terminal to a server terminal to request to obtain a resource, and define the locations of the first byte and the last byte of the resource, so that the corresponding resource content, that is to say, a certain file fragment, can be accurately obtained, which is a common technology used in the breakpoint resume function. In the present embodiment, the encoding and decoding service obtains corresponding file fragments for processing through HTTP RANGE requests, so it needs the data stream conversion service to open the HTTP interface, and when the encoding and decoding service sends a request, the data stream conversion service will send the requested file fragment to the encoding and decoding service.

S103-3: blocking and suspending the request when the file fragment requested by the encoding and decoding service is not received, and awakening the request when the file fragment is received completely;

Since the file fragments received by the data stream conversion service are well received at intervals according to a certain sequence, it is possible that the file fragments requested by the encoding and decoding service have not yet been received, at this time, the request of the encoding and decoding service needs to be blocked and suspended, and the request can be awakened and responded after the requested file fragments have been received.

the encoding and decoding service is implemented by the following steps:

S103-4: obtaining the basic information of the multimedia file that can be processed and the corresponding HTTP interface address from the message queue.

The encoding and decoding service can obtain the basic information of the multimedia file received and the corresponding HTTP interface address from the message queue, so as to initiate a request to the data stream conversion service when the multimedia file needs to be processed. It can be seen that, the information synchronization between the data stream conversion service and the encoding and decoding service is carried out through the message queue, to deliver the status of the multimedia file.

S103-5: calling a Fast Forward Motion Picture Experts Group (FFMPEG) tool to take the HTTP interface address obtained in the step of S103-4 as the input parameter of the FFMPEG tool, and to process the multimedia file corresponding to the HTTP interface address.

The encoding and decoding service is implemented based on the FFMPEG tool, takes the HTTP interface address obtained in the step of S103-4 as the input parameter of the FFMPEG tool, so that the FFMPEG tool can obtain the corresponding multimedia files through the HTTP interface address and process them.

As a further improvement of the multimedia file processing method, the data stream conversion service includes one data stream main thread and at least one HTTP thread. The data stream main thread is responsible for receiving and caching the file fragments, and sending the notification message to the message queue when the multimedia file to which the received file fragment belongs is received at the first time. The HTTP thread is responsible for processing the HTTP RANGE request sent by the encoding and decoding service. The HTTP thread sends the file fragment to the encoding and decoding service if the file fragment requested is ready; blocks and suspends the HTTP thread if the file fragment requested is not ready, when the main thread receives the file fragment satisfying the request, the data stream main thread awakens the HTTP thread and sends the file fragment to the encoding and decoding service. If the resources corresponding to the HTTP RANGE request of the encoding and decoding service are multiple file fragments, the HTTP thread will have the blocking or awakening processes many times during the working process for the file fragments arrive at intervals.

Correspondingly, the encoding and decoding service includes an encoding and decoding main process and a FFMPEG subprocess. The encoding and decoding main process continuously obtains the notification message from the message queue, whenever a notification message is obtained, obtains the HTTP interface address in the notification message and opens a FFMPEG subprocess, and takes the HTTP interface address as the input parameter of the FFMPEG subprocess, and then waits for the FFMPEG subprocess to be finished. The FFMPEG subprocess sends at least one HTTP RANGE request to the data stream conversion service sequentially according to the HTTP interface address, first requests the file fragment containing the metadata in the corresponding multimedia file, and then requests the other file fragments of the corresponding multimedia file, so as to encode or decode the corresponding multimedia file. It can be seen that, it is the FFMPEG subprocess actually to process the file fragments.

Figure 3:
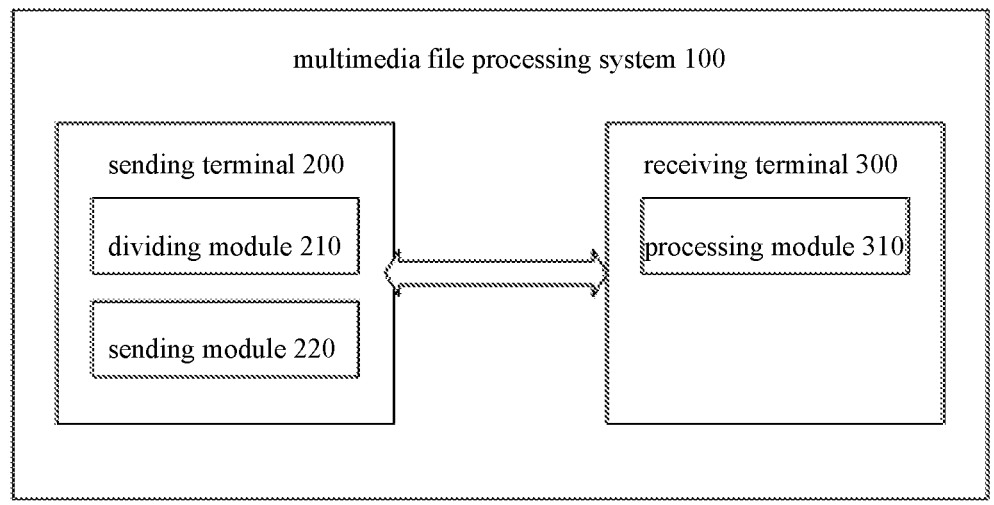
FIG. 3 is a schematic diagram illustrating an example multimedia file processing system in accordance with the present disclosure.

Please refer to FIG. 3, which is a structure block diagram of the multimedia file processing system 100 in a preferred embodiment of the present invention, the multimedia file processing system 100 includes a sending terminal 200 and a receiving terminal 300, is used to process multimedia a multimedia file transferred between the sending terminal 200 and the receiving terminal 300. The multimedia file processing system 100 includes:

a dividing module 210

The dividing module 210 is arranged in the sending terminal 200, and divides the multimedia file to be transferred into at least two file fragments. The dividing module 210 also records the order of the file fragments, which is arranged according to the playing order of the multimedia file.

a sending module 220

The sending module 220 is arranged in the sending terminal 200, first sends a file fragment containing the metadata of the multimedia file to the receiving terminal 300, and then sends other file fragments to the receiving terminal 300 according to a preset order. The sending module 220 selects the file fragment containing the metadata according to the preset position of the metadata in the multimedia file and sends it preferentially, and then sends the other file fragments according to the preset order.

a processing module 310

The processing module 310 is arranged in the receiving terminal 300, after receiving the file fragment containing the metadata of the multimedia file, processes the subsequent received file fragments according to the metadata.

A computer readable storage medium storing a computer program that is used to process a multimedia file transferred between a sending terminal and a receiving terminal is also disclosed herein. The following steps are carried out when the computer program is executed by a processor:

The sending terminal dividing the multimedia file to be transferred into at least two file fragments;

The sending terminal first sending a file fragment containing the metadata of the multimedia file to the receiving terminal, and then sending other file fragments to the receiving terminal according to a preset order;

The receiving terminal, after receiving the file fragment containing the metadata of the multimedia file, processing the subsequent received file fragments according to the metadata.

As a further improvement of the computer program, the sending terminal divides the multimedia file into the file fragments according to the playing order of the multimedia file, wherein the file fragment containing the metadata of the multimedia file is arranged at the end of the multimedia file; the sending terminal first sends the file fragment containing the metadata arranged at the end of the multimedia file to the receiving terminal, and then sends the other file fragments to the receiving terminal according to the playing order starting from the head of the multimedia file.

As a further improvement of the computer program, the receiving terminal processes the file fragments through a data stream conversion service and an encoding and decoding service, and the data stream conversion service interacts with the encoding and decoding service through a HTTP protocol.

The data stream conversion service is implemented by the following steps:

Receiving and caching file fragments from at least one multimedia file arriving at intervals, and sending a notification message to a message queue whenever the multimedia file to which the file fragment received belongs is received at the first time, wherein the notification message includes the basic information of the multimedia file and the corresponding HTTP interface address;

Opening the HTTP interface, and allowing the encoding and decoding service to obtain data of any file fragment through a HTTP RANGE request;

Blocking and suspending the request when the file fragment requested by the encoding and decoding service is not received, and awakening the request when the file fragment is received completely;

the encoding and decoding service is implemented by the following steps:

Obtaining the basic information of the multimedia file that can be processed and the corresponding HTTP interface address from the message queue;

Calling a FFMPEG tool to take the obtained HTTP interface address as the input parameter of the FFMPEG tool, and to process the multimedia file corresponding to the HTTP interface address.

As a further improvement of the computer program, the data stream conversion service includes one data stream main thread and at least one HTTP thread; the data stream main thread is responsible for receiving and caching the file fragments, and sending the notification message to the message queue when the multimedia file to which the received file fragment belongs is received at the first time, the HTTP interface address in the notification message is the address that the HTTP thread monitors; the HTTP thread is responsible for processing the HTTP RANGE request sent by the encoding and decoding service, sending the file fragment to the encoding and decoding service if the file fragment requested is ready; blocking the HTTP RANGE request if the file fragment requested is not ready, and the HTTP RANGE request is blocked or awakened by the data stream main thread at least one time according to the status that whether the corresponding file fragment is received or not.

As a further improvement of the computer program, the encoding and decoding service includes an encoding and decoding main process and a FFMPEG subprocess; the encoding and decoding main process continuously obtains the notification message from the message queue, whenever a notification message is obtained, obtains the HTTP interface address in the notification message and opens a FFMPEG subprocess, and takes the HTTP interface address as the input parameter of the FFMPEG subprocess, and then waits for the FFMPEG subprocess to be finished; the FFMPEG subprocess sends at least one HTTP RANGE request to the data stream conversion service sequentially according to the HTTP interface address, first requests the file fragment containing the metadata in the corresponding multimedia file, and then requests the other file fragments of the corresponding multimedia file, so as to encode or decode the corresponding multimedia file.

As a further improvement of the computer program, when the size of the multimedia file is less than 2 GB, the size of each file fragment divided is 2 MB to 10 MB.

As a further improvement of the computer program, the processing to the file fragments includes any one of image capturing, audio intercepting, transcoding, encoding and decoding.

The implementation of the methods and the steps of the computer program mentioned above is consistent with that of the multimedia file processing method in the present invention, and will not be repeated.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 4:
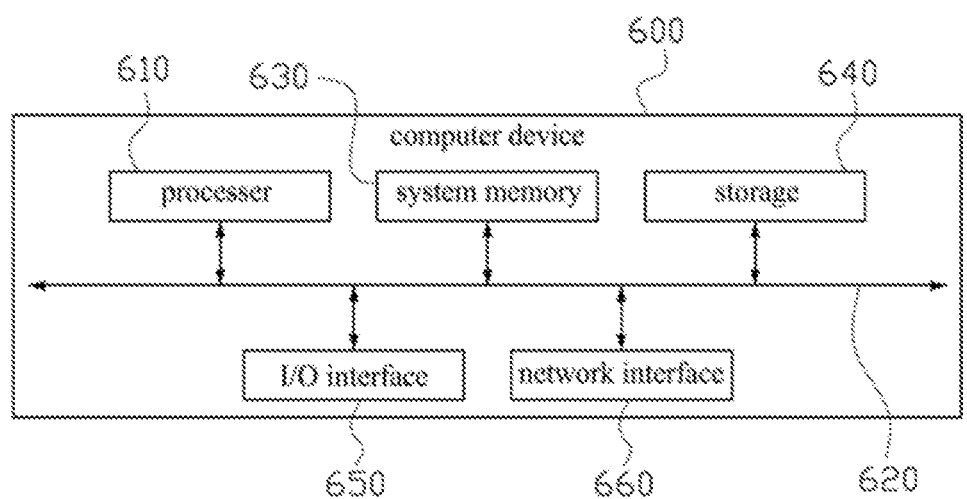
FIG. 4 is a schematic diagram illustrating an example computing device that may be used in accordance with the present disclosure.

In at least some embodiments, a server or computing device that implements a portion or all of one or more of the technologies described herein, including the techniques to implement the functionality of the sending terminal 200 and the receiving terminal 300, may include a general-purpose computer system that includes or is configured to access one or more computer-accessible media. FIG. 4 illustrates such a general-purpose computing device 600. In the illustrated embodiment, computing device 600 includes one or more processors 610 (which may be referred herein singularly as "a processor 610" or in the plural as "the processors 610") are coupled through a bus 620 to a system memory 630. Computing device 600 further includes a permanent storage 640, an input/output (I/O) interface 650, and a network interface 660.

In various embodiments, the computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 630 may be configured to store instructions and data accessible by processor(s) 610. In various embodiments, system memory 630 may be implemented using any suitable memory technology, such as static random access memory (SRAM), synchronous dynamic RAM (SDRAM), nonvolatile/Flash-type memory, or any other type of memory.

In one embodiment, I/O interface 650 may be configured to coordinate I/O traffic between processor 610, system memory 630, and any peripheral devices in the device, including network interface 660 or other peripheral interfaces. In some embodiments, I/O interface 650 may perform any necessary protocol, timing, or other data transformations to convert data signals from one component (e.g., system memory 630) into a format suitable for use by another component (e.g., processor 610). In some embodiments, I/O interface 650 may include support for devices attached through various types of peripheral buses, such as a variant of the Peripheral Component Interconnect (PCI) bus standard or the Universal Serial Bus (USB) standard, for example. In some embodiments, the function of I/O interface 650 may be split into two or more separate components, such as a north bridge and a south bridge, for example. Also, in some embodiments some or all of the functionality of I/O interface 650, such as an interface to system memory 630, may be incorporated directly into processor 610.

Network interface 660 may be configured to allow data to be exchanged between computing device 600 and other device or devices attached to a network or network(s). In various embodiments, network interface 660 may support communication via any suitable wired or wireless general data networks, such as types of Ethernet networks, for example. Additionally, network interface 660 may support communication via telecommunications/telephony networks such as analog voice networks or digital fiber communications networks, via storage area networks such as Fibre Channel SANs or via any other suitable type of network and/or protocol.

In some embodiments, system memory 630 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 600 via I/O interface 650. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 630 or another type of memory.

Further, a computer-accessible medium may include transmission media or signals such as electrical, electromagnetic or digital signals, conveyed via a communication medium such as a network and/or a wireless link, such as may be implemented via network interface 660. Portions or all of multiple computing devices may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method of processing multimedia files, comprising:
receiving, by a data stream conversion service of a server of a multimedia provider, a plurality of fragments of at least a multimedia file, wherein the data stream conversion service first receives a first fragment containing metadata of the at least a multimedia file and subsequently receives other fragments of the at least a multimedia file in a predetermined order;
sending, by the data stream conversion service, a notification message to a message queue in response to receiving the first fragment, wherein the notification message is transmitted from the data stream conversion service to an encoding and decoding service of the server of the multimedia provider via the message queue, wherein the notification message includes the metadata of the at least a multimedia file and a corresponding Hyper Text Transfer Protocol (HTTP) interface address, wherein the server of the multimedia provider processes the at least a multimedia file in real time through the data stream conversion service and the encoding and decoding service while the at least a multimedia file is being uploaded to the server, and wherein the message queue is configured to synchronize information indicative of a status of the at least a multimedia file between the data stream conversion service and the encoding and decoding service;
obtaining, by the encoding and decoding service, the notification message from the message queue; and
processing, by the encoding and decoding service, the other fragments of the at least a multimedia file based at least in part on the notification message.

2. The method of claim 1, wherein the data stream conversion service comprises a data stream main thread and at least a HTTP thread.

3. The method of claim 2, wherein the data stream main thread receives and caches the plurality of fragments of the at least a multimedia file, and the data stream main thread sends the notification message to the message queue.

4. The method of claim 2, wherein the at least a HTTP thread monitors the corresponding HTTP interface address and processes at least a HTTP range request sent from the encoding and decoding service.

5. The method of claim 4, wherein the at least a HTTP thread sends a fragment to the encoding and decoding service upon receiving a HTTP range request based on determining that the requested fragment is received, or the at least a HTTP thread suspends the HTTP range request based on determining that the requested fragment is not received.

6. The method of claim 1, wherein the encoding and decoding service comprises an encoding and decoding main process and at least a Fast Forward Motion Picture Experts Group (FFMPEG) subprocess.

7. The method of claim 6, wherein the encoding and decoding main process obtains the notification message from the message queue, and the encoding and decoding main process starts the at least a FFMPEG subprocess in response to obtaining the corresponding HTTP interface address from the notification message.

8. The method of claim 6, wherein the at least a FFMPEG subprocess sends at least a HTTP range request according to the corresponding HTTP interface address, and the FFMPEG subprocess first requests for the first fragment containing metadata of the at least a multimedia file and then requests for the other fragments of the at least a multimedia file.

9. The method of claim 1, wherein a size of the at least a multimedia file is less than 2 GB, and a size of each file fragment is approximately in a range of 2 MB to 10 MB.

10. The method of claim 1, wherein the processing, by the encoding and decoding service, the other fragments of the at least a multimedia file comprises at least one of image capturing, audio intercepting, transcoding, encoding or decoding.

11. A system of processing multimedia files, comprising:
at least a processor; and
at least a memory communicatively coupled to the at least a processor to configure the at least a processor to:
receive, by a data stream conversion service of a server of a multimedia provider, a plurality of fragments of at least a multimedia file, wherein the data stream conversion service first receives a first fragment containing metadata of the at least a multimedia file and subsequently receives other fragments of the at least a multimedia file in a predetermined order;
send, by the data stream conversion service, a notification message to a message queue in response to receiving the first fragment, wherein the notification message is transmitted from the data stream conversion service to an encoding and decoding service of the server of the multimedia provider via the message queue, wherein the notification message includes the metadata of the at least a multimedia file and a corresponding Hyper Text Transfer Protocol (HTTP) interface address, wherein the server of the multimedia provider processes the at least a multimedia file in real time through the data stream conversion service and the encoding and decoding service while the at least a multimedia file is being uploaded to the server, and wherein the message queue is configured to synchronize information indicative of a status of the at least a multimedia file between the data stream conversion service and the encoding and decoding service;
obtain, by the encoding and decoding service, the notification message from the message queue; and
process, by the encoding and decoding service, the other fragments of the at least a multimedia file based at least in part on the notification message.

12. The system of claim 11, wherein the data stream conversion service comprises a data stream main thread and at least a HTTP thread.

13. The system of claim 12, wherein the data stream main thread receives and caches the plurality of fragments of the at least a multimedia file, the data stream main thread sends the notification message to the message queue, and the at least a HTTP thread monitors the corresponding HTTP interface address and processes at least a HTTP range request sent from the encoding and decoding service.

14. The system of claim 13, wherein the at least a HTTP thread sends a fragment to the encoding and decoding service upon receiving a HTTP range request based on determining that the requested fragment is received, or the at least a HTTP thread suspends the HTTP range request based on determining that the requested fragment is not received.

15. The system of claim 11, wherein the encoding and decoding service comprises an encoding and decoding main process and at least a Fast Forward Motion Picture Experts Group (FFMPEG) subprocess.

16. The system of claim 15, wherein the encoding and decoding main process obtains the notification message from the message queue and starts the at least a FFMPEG subprocess in response to obtaining the corresponding HTTP interface address from the notification message, the at least a FFMPEG subprocess sends at least a HTTP range request according to the corresponding HTTP interface address, and the FFMPEG subprocess first requests for the first fragment containing metadata of the at least a multimedia file and then requests for the other fragments of the at least a multimedia file.

17. A non-transitory computer-readable storage medium bearing computer-readable instructions that upon execution on a computing device cause the computing device at least to:
receive, by a data stream conversion service of a server of a multimedia provider, a plurality of fragments of at least a multimedia file, wherein the data stream conversion service first receives a first fragment containing metadata of the at least a multimedia file and subsequently receives other fragments of the at least a multimedia file in a predetermined order;
send, by the data stream conversion service, a notification message to a message queue in response to receiving the first fragment, wherein the notification message is transmitted from the data stream conversion service to an encoding and decoding service of the server of the multimedia provider via the message queue, wherein the notification message includes the metadata of the at least a multimedia file and a corresponding Hyper Text Transfer Protocol (HTTP) interface address, wherein the server of the multimedia provider processes the at least a multimedia file in real time through the data stream conversion service and the encoding and decoding service while the at least a multimedia file is being uploaded to the server, and wherein the message queue is configured to synchronize information indicative of a status of the at least a multimedia file between the data stream conversion service and the encoding and decoding service;
obtain, by the encoding and decoding service, the notification message from the message queue; and
process, by the encoding and decoding service, the other fragments of the at least a multimedia file based at least in part on the notification message.

18. The non-transitory computer-readable storage medium of claim 17, wherein the data stream conversion service comprises a data stream main thread and at least a HTTP thread, the data stream main thread receives and caches the plurality of fragments of the at least a multimedia file, and the data stream main thread sends the notification message to the message queue.

19. The non-transitory computer-readable storage medium of claim 18, wherein the at least a HTTP thread monitors the corresponding HTTP interface address and processes at least a HTTP range request sent from the encoding and decoding service, and the at least a HTTP thread sends a fragment to the encoding and decoding service upon receiving a HTTP range request based on determining that the requested fragment is received or the at least a HTTP thread suspends the HTTP range request based on determining that the requested fragment is not received.

20. The non-transitory computer-readable storage medium of claim 17, wherein the encoding and decoding service comprises an encoding and decoding main process and at least a Fast Forward Motion Picture Experts Group (FFMPEG) subprocess, the encoding and decoding main process obtains the notification message from the message queue and starts the at least a FFMPEG subprocess in response to obtaining the corresponding HTTP interface address from the notification message, the at least a FFMPEG subprocess sends at least a HTTP range request according to the corresponding HTTP interface address, and the FFMPEG subprocess first requests for the first fragment containing metadata of the at least a multimedia file and then requests for the other fragments of the at least a multimedia file.

* * * * *